US007546489B2

(12) United States Patent  (10) Patent No.: US 7,546,489 B2
Gittins et al.  (45) Date of Patent: Jun. 9, 2009

(54) REAL TIME EVENT LOGGING AND ANALYSIS IN A SOFTWARE SYSTEM

(75) Inventors: Robert Sherwood Gittins, Divide Colorado, CO (US); Robert Charles Swindler, Jr., Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 486 days.

(21) Appl. No.: 11/042,490

(22) Filed: Jan. 25, 2005

(65) Prior Publication Data

US 2006/0168479 A1 Jul. 27, 2006

(51) Int. Cl.
*G06F 11/00* (2006.01)
(52) U.S. Cl. .............................. 714/39; 714/37; 714/38; 714/45; 709/224; 709/225; 709/226
(58) Field of Classification Search .................. 714/37, 714/38, 45; 709/224–226
See application file for complete search history.

(56) References Cited

U.S. PATENT DOCUMENTS

| 5,297,258 | A | | 3/1994 | Hale et al. |
| 5,612,898 | A | * | 3/1997 | Huckins ..................... 709/224 |
| 5,638,514 | A | | 6/1997 | Yoshida et al. |
| 5,712,979 | A | | 1/1998 | Graber et al. |
| 5,745,686 | A | | 4/1998 | Saito et al. |
| 5,790,427 | A | | 8/1998 | Greer et al. |
| 5,829,053 | A | | 10/1998 | Smith et al. |
| 5,835,955 | A | | 11/1998 | Dornier et al. |
| 5,860,079 | A | | 1/1999 | Smith et al. |
| 5,912,669 | A | | 6/1999 | Hsia |
| 5,930,476 | A | | 7/1999 | Yamunachari et al. |
| 5,949,415 | A | | 9/1999 | Lin et al. |
| 5,949,976 | A | | 9/1999 | Chappelle |
| 5,966,705 | A | | 10/1999 | Koneru et al. |
| 5,996,054 | A | | 11/1999 | Ledain et al. |
| 6,041,423 | A | | 3/2000 | Tsukerman |
| 6,065,018 | A | | 5/2000 | Beier et al. |
| 6,125,392 | A | * | 9/2000 | Labatte et al. ............... 709/224 |
| 6,397,348 | B1 | | 5/2002 | Styczinski |
| 6,418,445 | B1 | | 7/2002 | Moerbeek |
| 6,449,623 | B1 | | 9/2002 | Bohannon et al. |
| 6,477,617 | B1 | | 11/2002 | Golding |
| 6,493,837 | B1 | | 12/2002 | Pang et al. |
| 6,510,463 | B1 | | 1/2003 | Farhat et al. |
| 6,539,341 | B1 | | 3/2003 | Li et al. |
| 6,567,910 | B2 | | 5/2003 | Tessarolo et al. |
| 6,606,658 | B1 | | 8/2003 | Uematsu |
| 6,622,260 | B1 | * | 9/2003 | Marisetty et al. ............... 714/10 |

(Continued)

FOREIGN PATENT DOCUMENTS

EP  0913774 A2  5/1999

(Continued)

*Primary Examiner*—Robert Beausoliel
*Assistant Examiner*—Jeison C Arcos
(74) *Attorney, Agent, or Firm*—Fellers, Snider, et al.

(57) ABSTRACT

An apparatus and associated method is provided comprising a software system resident in a memory space configured to execute a service request which results in a plurality of events carried out by the software system to complete the service request, and creates a plurality of entries associated with the events, wherein each entry defines an operational state of the software system.

12 Claims, 5 Drawing Sheets

U.S. PATENT DOCUMENTS

| | | |
|---|---|---|
| 6,654,795 B1 | 11/2003 | Coile |
| 6,658,590 B1 | 12/2003 | Sicola et al. |
| 6,701,363 B1 | 3/2004 | Chiu et al. |
| 6,714,979 B1 | 3/2004 | Brandt et al. |
| 6,725,392 B1 | 4/2004 | Frey et al. |
| 6,732,293 B1 | 5/2004 | Schneider |
| 6,742,030 B1 | 5/2004 | MacPhail |
| 6,751,636 B1 | 6/2004 | Mende, Jr. et al. |
| 7,197,431 B2 * | 3/2007 | Barritz ................ 702/186 |
| 2002/0016843 A1 * | 2/2002 | Schweitzer et al. ......... 709/227 |
| 2002/0077791 A1 | 6/2002 | Go et al. |
| 2003/0051236 A1 * | 3/2003 | Pace et al. ................ 717/177 |
| 2003/0056199 A1 | 3/2003 | Li et al. |
| 2003/0056200 A1 * | 3/2003 | Li et al. ...................... 717/128 |
| 2003/0140209 A1 | 7/2003 | Testardi |
| 2003/0140210 A1 | 7/2003 | Testardi |
| 2004/0064639 A1 | 4/2004 | Sicola et al. |
| 2004/0181600 A1 | 9/2004 | Yamagami |
| 2004/0205398 A1 * | 10/2004 | Osborn et al. ................ 714/25 |
| 2006/0005080 A1 * | 1/2006 | Walker et al. ................ 714/38 |
| 2006/0041593 A1 * | 2/2006 | Borthakur et al. ........... 707/200 |

FOREIGN PATENT DOCUMENTS

| | | |
|---|---|---|
| EP | 0913774 A2 * | 6/1999 |
| WO | WO 00/55953 | 9/2000 |

* cited by examiner

US 7,546,489 B2

REAL TIME EVENT LOGGING AND ANALYSIS IN A SOFTWARE SYSTEM

FIELD OF THE INVENTION

The claimed invention relates generally to the field of computer software and more particularly, but not by way of limitation, to an apparatus and method for real time logging and analyzing event flows associated with execution of a service request in a software system.

BACKGROUND

Computer-based systems enable a wide variety of data processing tasks to be accomplished in a fast and efficient manner. From hand-held consumer products to geographically distributed storage area networks with multi-device data storage arrays, such systems continue to proliferate into all areas of society and commerce.

Software is provided to direct the operation of such systems. Software (including firmware) can take a number of forms such as application programs, operating systems, interface and controller routines, and maintenance and housekeeping modules.

Each time a process is initiated by the software, a number of additional processes, handshakes, links, calculations, and other events can be carried out by the various layers of software in order to service and complete the service request. Generally, with increased complexity in the overall software system, including additional layers of software applications and operating systems, distributed processing and fault tolerant redundancy, it becomes increasingly difficult to assess the extent to which system resources are utilized to carry out a given process.

In some solutions these resultant events are logged for purposes of analysis in the event an execution error is identified. However, typically the error is identified at some time after the execution step causing the error, making it painstakingly difficult, if not impossible, to trace back through the logged events to ascertain a root cause. What is needed is a solution providing a real time analysis of system execution errors. It is to these benefits and advantages that the embodiments of the present invention are directed.

SUMMARY OF THE INVENTION

Embodiments of the present invention are generally directed to a method and an apparatus for logging and analyzing event flows associated with execution of a service request in a software system, such as a computer-based system comprising a multi-disc data storage array.

In some embodiments a method is provided comprising: executing a service request in a software system resulting in a plurality of events performed by the software system; accumulating in a selected memory space a plurality of entries associated with the events, wherein each entry defines a software system operational state; and analyzing the entries to determine whether an error occurred during the accumulating step.

In some embodiments an apparatus is provided comprising a software system resident in a memory space configured to execute a service request which results in a plurality of events carried out by the software system in completing the service request. The software system also creates a plurality of entries associated with the events, wherein each entry defines an operational state of the software system.

In some embodiments an apparatus is provided comprising a software system resident in a memory space configured to execute a service request which results in a plurality of events carried out by the software system to complete the service request, and means for determining a software system execution error by associating the state of the software system with the events.

These and various other features and advantages which characterize the claimed invention will become apparent upon reading the following detailed description and upon reviewing the associated drawings.

DETAILED DESCRIPTION

Figure 1:
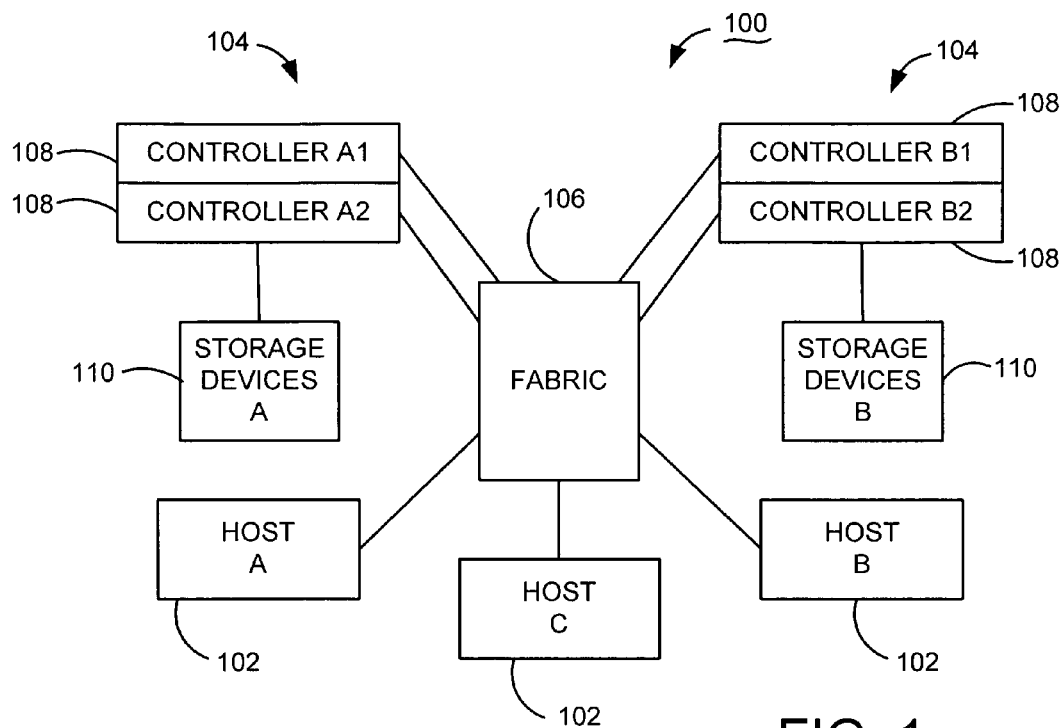
FIG. 1 is a top level functional block depiction of a computer-based system characterized as a storage area network utilizing mass storage.

To illustrate an exemplary environment in which presently preferred embodiments of the present invention can be advantageously practiced, FIG. 1 shows a computer-based system 100 characterized as a storage area network (SAN) utilizing mass storage.

The system 100 includes a number of host computers 102, respectively identified as hosts A, B and C. The host computers 102 interact with each other as well as with a pair of data storage arrays 104 (denoted A and B, respectively) via a fabric 106. The fabric 106 is preferably characterized as a fibre-channel based switching network, although other configurations can be utilized as well, including the Internet.

Each array 104 includes a pair of controllers 108 (denoted A1, A2 and B1, B2 respectively) and a set of data storage devices 110 preferably characterized as hard disc drives operated as a RAID (redundant array of independent discs). The controllers 108 and devices 110 preferably utilize a fault tolerant arrangement so that the various controllers 108 utilize parallel, redundant links and at least some of the user data stored by the system 100 is mirrored on both sets of devices 110.

It is further contemplated that the A host computer 102 and the A data storage array 104 are physically located at a first site, the B host computer 102 and B storage array 104 are physically located at a second site, and the C host computer 102 is at yet a third site, although such is merely illustrative and not limiting.

Figure 2:
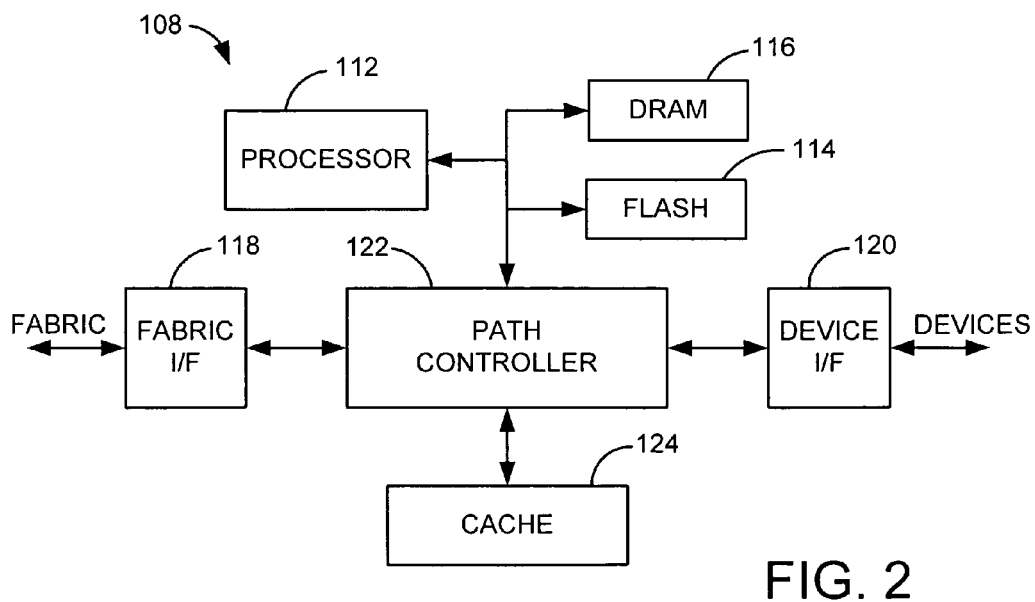
FIG. 2 provides a functional block diagram to illustrate a selected one of the controllers of FIG. 1.

FIG. 2 illustrates a selected one of the controllers 108 in greater detail. The controller 108 can be embodied in a single integrated circuit, or distributed among a number of discrete circuits as desired.

A main processor 112, preferably characterized as a programmable, general purpose computer processor, provides top level control in accordance with programming steps and processing data stored in non-volatile memory 114 (such as flash memory or similar) and in dynamic random access memory (DRAM) 116.

A fabric interface (I/F) circuit 118 communicates with the other controllers 108 and the host computers 102 via the fabric 106, and a device I/F circuit 120 communicates with the storage devices 110. The I/F circuits 118, 120 and a path controller 122 form a communication path to pass commands and data between the storage array and the host using cache memory 124.

Figure 3:
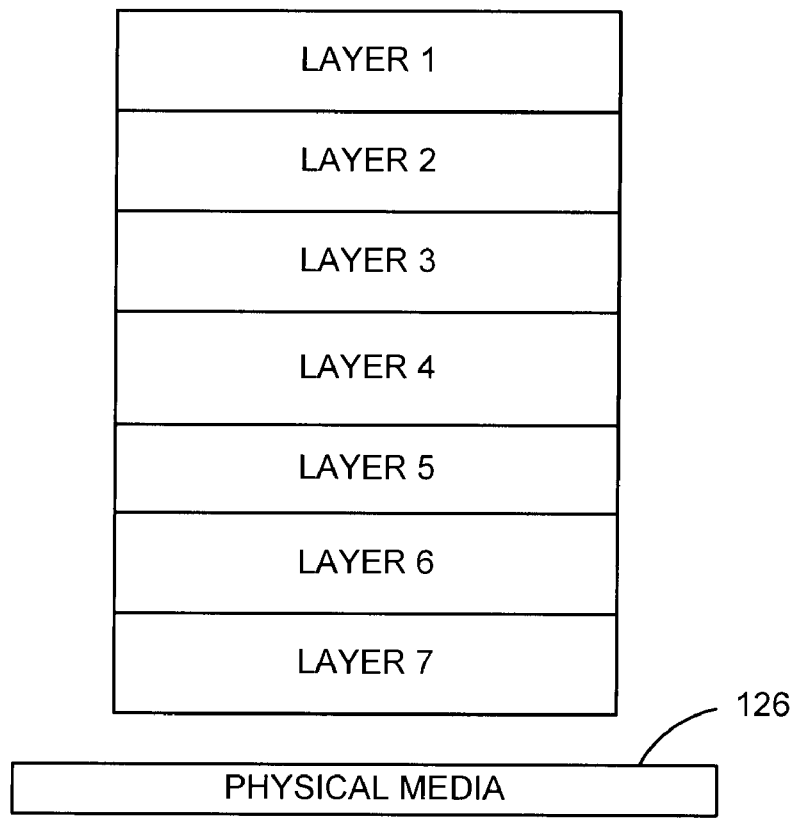
FIG. 3 illustrates a number of different software layers utilized by the system of FIG. 1.

FIG. 3 provides a generalized depiction of a preferred arrangement for software utilized by the system 100 of FIG. 1. In FIG. 3, the software is viewed as being arranged in a number of hierarchical layers (in this case Layer 1 through Layer 7), with Layer 1 representing a top-most layer in farthest proximity to physical media 126 of the devices 110, and Layer 7 representing a bottom-most layer most closely associated with the media 126. Other suitable arrangements can be used as desired, including different numbers and types of layers. For purposes of the present discussion, it is contemplated that Layers 1-3 generally represent application routines and operating systems utilized by the host computers 102, Layers 4-5 represent routines and modules at the controller 108 level, and layers 6-7 represent routines and modules at the device 110 level.

As will be recognized, a data transfer request from a selected host computer 102 to write data to the devices 110 will invoke one or more host level command processes. Such processes in turn invoke various other processes down and back up through the various layers to ultimately result in the completion of the desired task. Along the way, various system resources are allocated, utilized and released.

Figure 4:
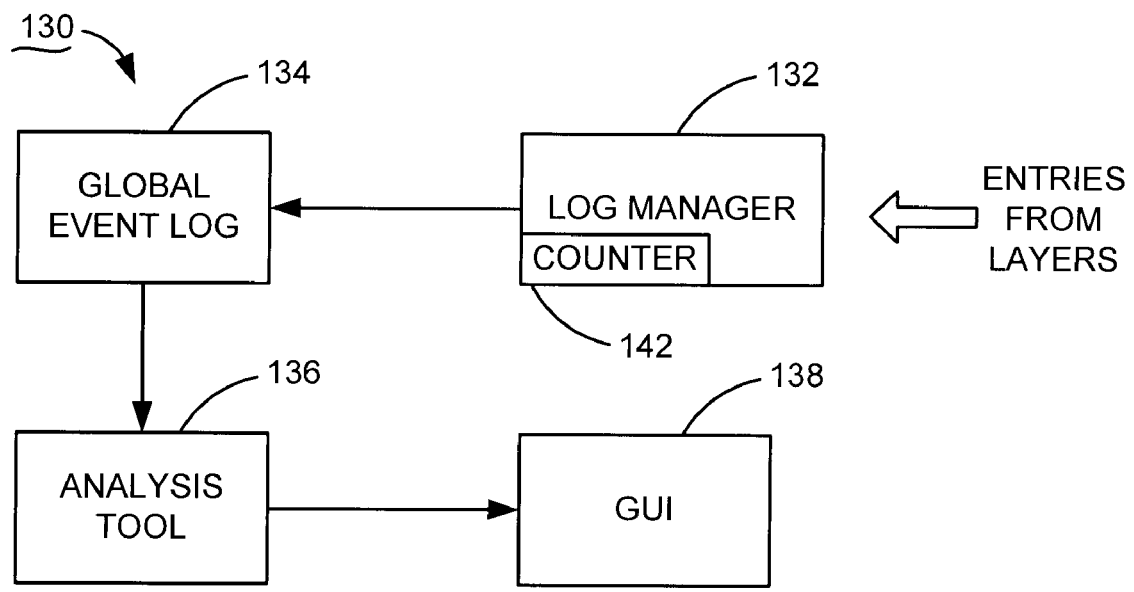
FIG. 4 provides a preferred arrangement for an event log and analysis module utilized by the software of FIG. 3.

FIG. 4 represents a preferred arrangement for an event log and analysis module 130 used to collect entries associated with each event carried out by the software of the system 100, at all levels, and then to generate an analysis of software system resource utilization from the sequence of entries. The module 130 preferably includes a log manager block 132, a global event log 134, an analysis tool 136 and a graphical user interface (GUI) 138. Each of these blocks will be discussed in greater detail below.

Figure 5:
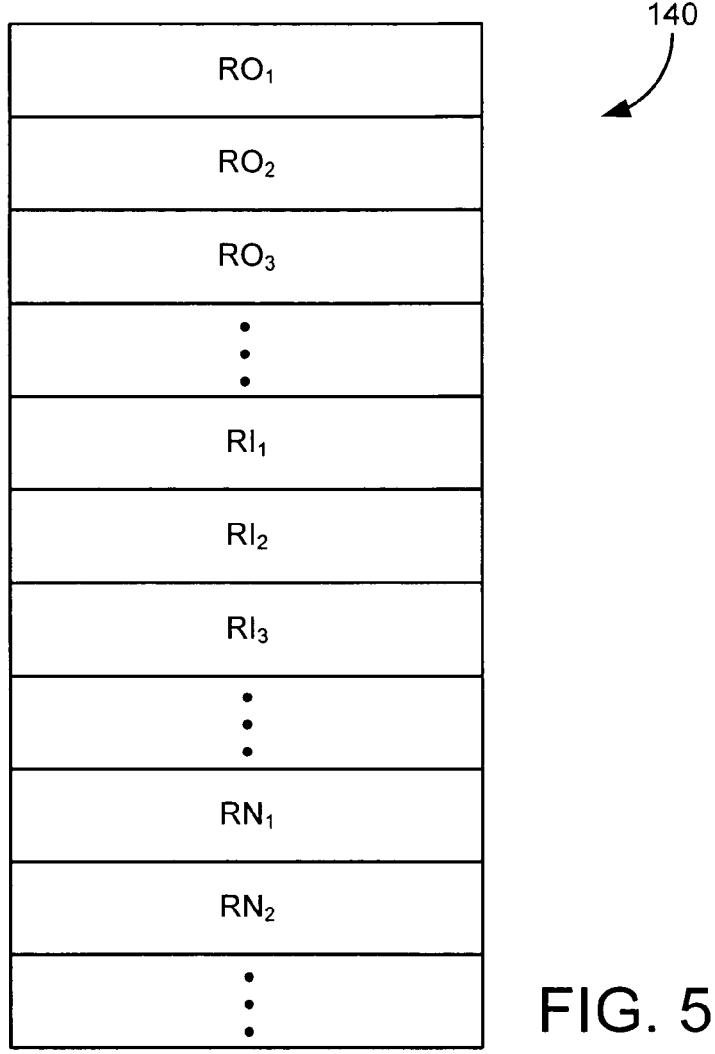
FIG. 5 shows a resource index stack to identify system resources available to the software of FIG. 3.

FIG. 5 provides a resource index stack 140 to illustrate various types of system resources utilized by the system software. Because the formats and nomenclatures for the resources can vary widely depending upon the architecture of a given application, for simplicity the resources will be generically referred to as Resource 0 through Resource N. Resource 1, for example, can represent an operation request which is used to identify various variables, values or attributes associated with a given host level command process, and so on.

Figure 6:
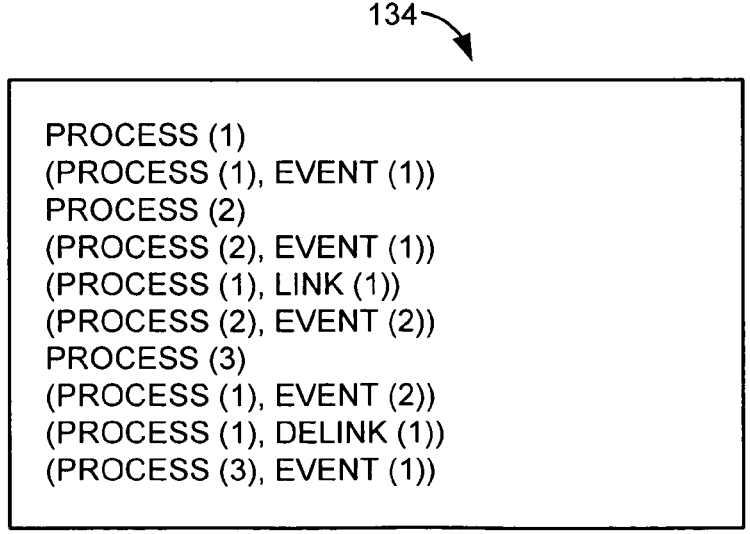
FIG. 6 depicts a generalized format for the global event log of FIG. 4.

During operation, a service request will generally allocate one or more of the resources to perform a desired operation, and may invoke or link to one or more lower level processes until the service request is completed. Preferably, upon the operation of every event, each of the software layers operates to provide an entry into the global event log 134, as depicted by FIG. 6. The log 134 is preferably written to a selected disc location on the media 126 and represents a sequential listing of all events carried out by the software.

Each entry is associated with a respective event, and defines the operational state of the software system at a time corresponding to the event. The event entries also include indexing information that identifies the initiating process (such as Process(1), Process(2), and Process(3) as generally identified in FIG. 6). Each event is broadly defined by the operation of a particular layer or module to obtain a result, such as the retrieval of or writing of data to a memory space, performing a calculation, linking to or delinking from another layer, etc. Preferably, all layers write to the same log and the log reflects all activity in a time-sequential manner.

The size of the log (i.e., the amount of memory allocated therefor) can be selectively varied by the log manager and by inputs from the user. A larger allocated space will track a greater history window, but will also consume greater system resources. It is contemplated that the log is preferably sized to reflect several hours of continued operation of the system 100. The log 134 is further preferably characterized as having a buffer for storing a predetermined plurality of the entries, which can be batch processed by the analysis tool 136 for reducing the processing overhead burden on the system 100. A counter 142 (FIG. 4) of the log manager 132 can be used for collection and/or retention of the predetermined number of entries.

Figure 7:
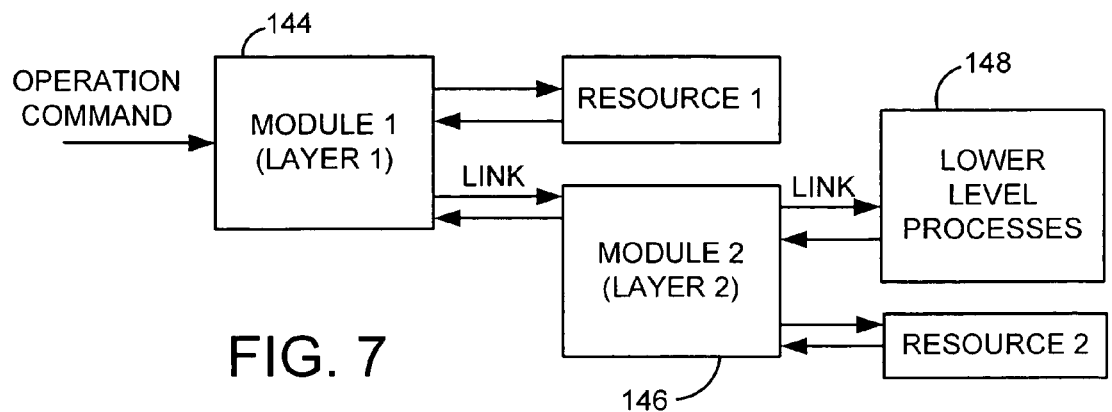
FIG. 7 generally illustrates a partial chain of events carried out in response to issuance of an operation request.

FIG. 7 represents initial operations carried out in response to a selected initiating process. For purposes of illustration, it is contemplated that this process is an operation command associated with the writing of user data by a selected host computer 102 to the devices 110.

As shown by FIG. 7, the top level command invokes the operation of a first module 144 in Layer 1 which allocates a first resource (Resource 1) and links to a second module 146 in Layer 2. The second module 146 allocates a second resource (Resource 2) and performs one or more additional links to lower level processes (denoted at 148). This process will continue until at some point the user data are transferred to cache memory 124 (FIG. 2), a write-back command is issued to the initiating host computer 102, the data are transferred to the appropriate physical media 126, and the responsible controller is notified that the data have been successfully written. It will be noted that the global event log 134 preferably captures all events relating to the service request, including events that are carried out after the top level process has been identified as being completed (as in, for example, the case of write-back data).

The log 134 can be updated in a real-time fashion, but process efficiencies can be generally obtained by caching, at either a layer level and/or at a device level, a short listing of the recent events which is then transferred to the log manager at an appropriate time. In this way, the global collection of event data as described herein can have a reduced, if not wholly transparent, effect upon system 100 availability.

The analysis tool 136 of FIG. 4 preferably operates in response to manual user requests to poll the global event log 134 and retrieve all entries relating to a particular initiating process. The analysis tool uses the addresses for link and delink events to expand and contract its search lists, thereby accounting for all of the events associated with the service request through the various layers.

Figure 8:
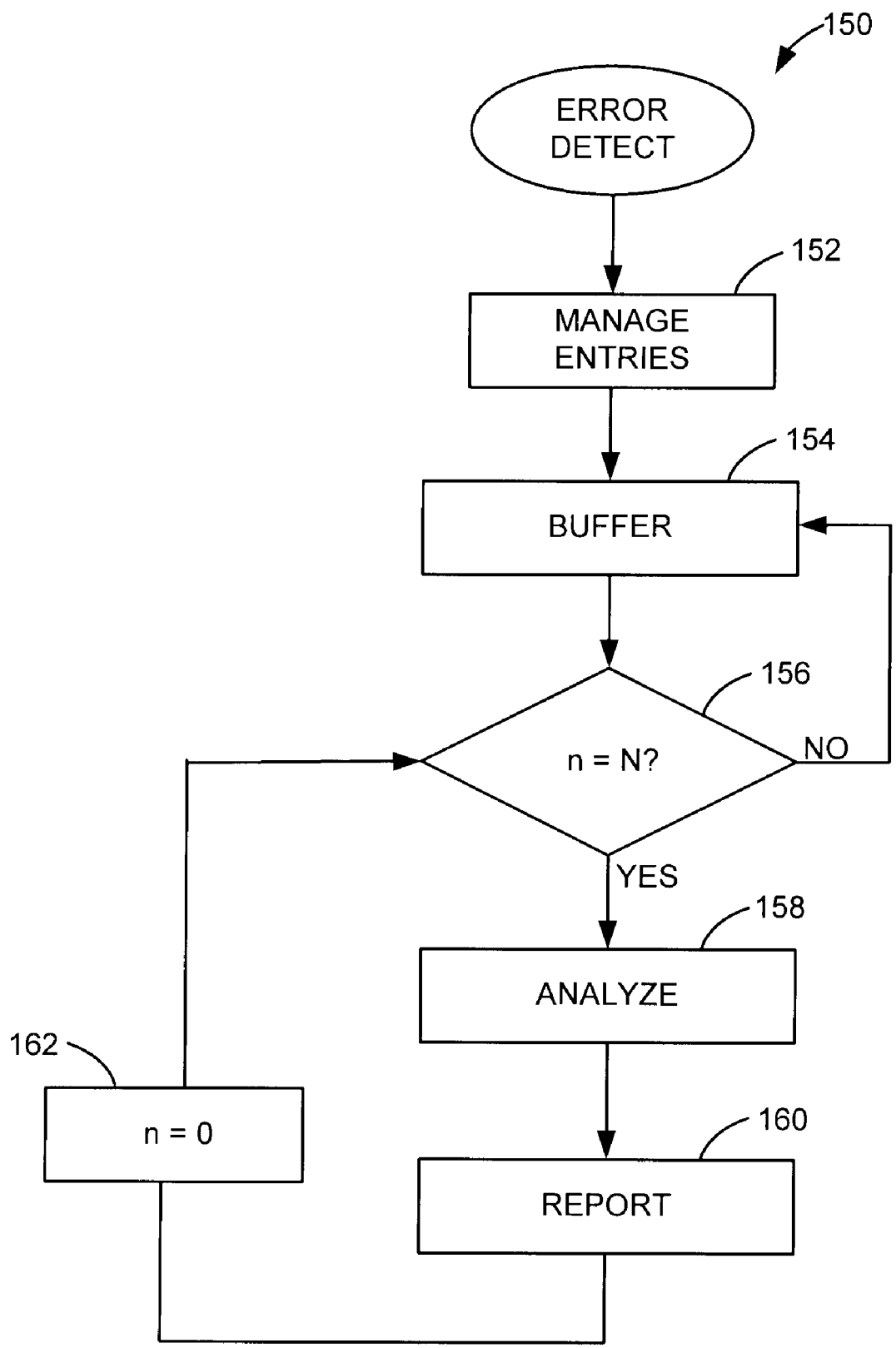
FIG. 8 is a flowchart of illustrative steps of an error detect method in accordance with embodiments of the present invention.

FIG. 8 is a flowchart illustrating steps for an error detect method 150 performed by the logging and analysis module 130 in accordance with embodiments of the present invention. The method begins with executing the service request in the software system resulting in the plurality of events performed by the software system, and managing the entries by the software system associated with the events in block 152. In block 154 the entries are accumulated until the predetermined number are obtained. In determination block 156 it is determined whether the sample collected, "n," is equal to the predetermined number desired, "N." If no, then processing returns to block 154 and more entries are obtained. If yes, then control passes to block 158 where the analysis tool 136 batch processes the entries to determine whether any execution error is evident. The results of the analysis are reported in block 160. The counter is reset in block 162 and control returns to block 156 where the next set of entries is obtained.

Figure 9:
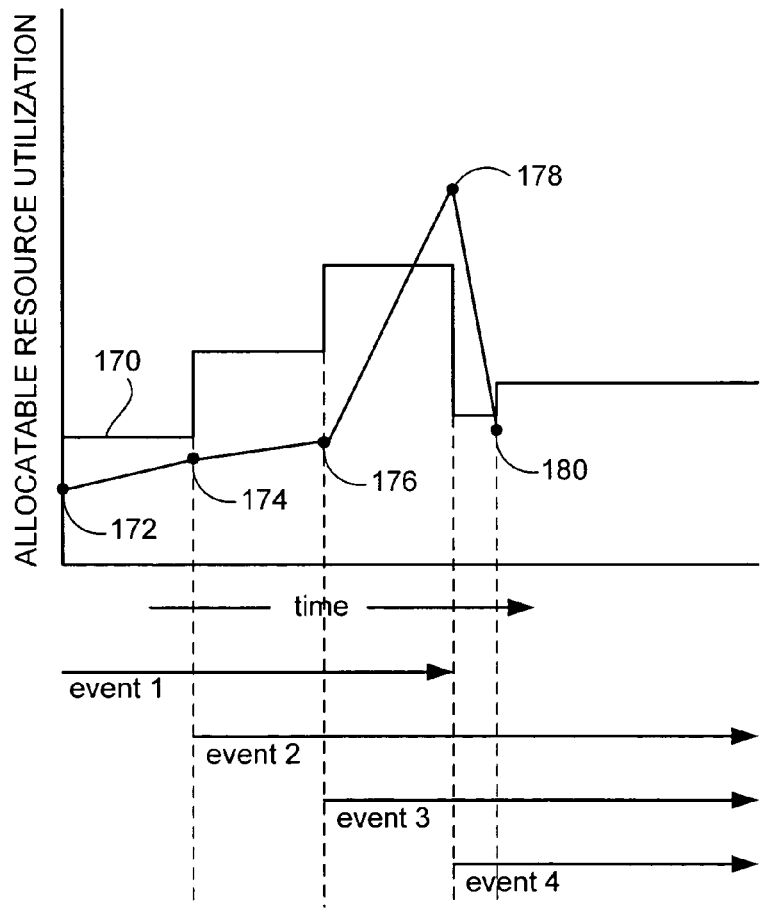
FIG. 9 represents an illustrative output of the analysis tool in tracking the entries from the global data log of FIG. 6.

The resulting analysis can be presented by the GUI 138 in any suitable fashion, such as the system resource utilization diagram in FIG. 9, or in time sequence order to provide the desired system allocation information desired in relation to the events that resulted from the initial service request. In the embodiments of FIG. 9 a threshold utilization 170 provides a visual comparison against individual utilization indications 172-180. Variance bands (not shown) can be constructed around the threshold 170 to identify potential error conditions. For example, it would appear that the observed utilization 176 is substantially below the expected level, while the observed utilization 178 is substantially above the expected level. Variances such as these can be used to investigate the root cause for error conditions.

It is contemplated that the GUI 138 is accessible via the host computers 102 using system administrator access, although other suitable arrangements including a dedicated computer can be utilized as well.

The analysis tool 136 can also be operated in an automated fashion in response to certain pre-set or user selectable occurrences, such as command timeouts, error conditions and the like, in order to provide an indication of system utilization in the moments leading up to such occurrences.

The global event log 134 is preferably physically arranged as a single structure, but in other preferred embodiments the log can be physically distributed among different locations so long as the log correctly reflects all of the entries associated with each event. The logging and analysis module 130 thus provides valuable information regarding system resource utilization during system design efforts as well as during field maintenance performance evaluation and failure analysis.

In view of the foregoing discussion, it will now be understood that preferred embodiments of the present invention are generally directed to a method and apparatus for logging and analyzing event flows associated with execution of a service request in a software system, such as a computer-based system (such as 100) comprising a multi-disc data storage array (such as 104).

Execution of the service request preferably results in a plurality of events carried out by multiple layers of the software system. A global event log (such as 134) accumulates a corresponding plurality of entries, each defining a current software system state.

An analysis tool (such as 136) preferably accesses the global event log to provide a real time indication of execution errors, such as in a graphical display by a graphical user interface (such as 138). A log manager preferably controls operation of the global event log (such as 132).

Entries in the global event log are preferably entered sequentially for each ongoing process, and each entry preferably includes an identifier that identifies the associated service request.

For purposes of the appended claims, the recited "means for determining" will be understood to correspond to the disclosed module 130 of FIG. 4. Systems that provide localized logging of some events at certain layers without providing a centralized logging of all events associated with a particular service request fail to carry out the recited function and are excluded from the definition of an equivalent.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed is:

1. A method comprising:
   executing a service request in a multiple layer software system resulting in a plurality of events performed by the software system, wherein at least one of the plurality of events comprises linking a higher level layer and a lower level layer of the software system, and wherein at least one of the plurality of events comprises allocating a resource;
   accumulating in a global event log plurality of entries associated with the plurality of events, each said entry defining a software system operational state reflecting a progression of the plurality of events; and
   analyzing a subset of entries from the plurality of entries in the global event log by comparing, with respect to each entry in the subset of entries, an instantaneous actual resource utilization level to an instantaneous expected resource utilization level in order to identify a potential failure condition of the software system during the accumulating step.

2. The method of claim 1 wherein at least one of the plurality of entries identifies a link event from a first layer to a second layer, and wherein at least another one of the plurality of entries identifies a delink event from the second layer back to the first layer.

3. The method of claim 1, wherein each said subset of entries has a total of n entries, and each said subset of entries is subjected to the analyzing step in turn when a corresponding number of n entries has been added to the global event log.

4. The method of claim 1, wherein the software system forms a portion of a computer-based system comprising a data storage array.

5. The method of claim 1, wherein a first selected layer of the multiple layers of software comprises software resident in a first device, and wherein a second selected layer of the multiple layers of software comprises software resident in a separate, second device.

6. The method of claim 1, wherein the service request comprises a host level user initiated request.

7. An apparatus comprising
   a computer readable medium on which a software utility is stored, the utility configured to accumulate in a global event log in a memory space a plurality of entries, each entry defining a system operational state corresponding to a plurality of events carried out by a multiple layer software system during execution of a service request, wherein at least one entry corresponds to linking a higher level and a lower level of the software system during said execution, and wherein at least one entry corresponds to allocating a resource; and wherein the utility is further configured to sequentially transfer a subset of sequential entries from the global event log to a second memory space and to analyze each said subset in turn to predict a failure of the software system by comparing, with respect to each entry in the subset of entries, an instantaneous observed system utilization level to an instantaneous expected utilization level.

8. The apparatus of claim 7 further comprising a counter which accumulates a count of said entries added to the global event log and which signals the utility to transfer the subset of said entries when the count reaches a predetermined value n.

9. The apparatus of claim 7 wherein the service request is characterized as a first service request, and wherein the utility is further configured to accumulate entries into the global event log corresponding to events carried out by the software system during a second service request executed during execution of the first service request, wherein the respective entries in the global event log associated with the second service request are commingled with the entries associated with the first service request in a time-sequence corresponding to an ordering in which the respective events occurred.

10. An apparatus comprising:

a computer system on which a multiple layer software system is operated, wherein the software system executes a service request resulting in a plurality of events including at least one event linking a higher level and a lower level of the software system and at least one event allocating resources; and an event logging and analysis module resident in a memory of the computer system which accumulates in a global log a corresponding plurality of entries, each entry defining a software system operational state associated with a progression of said plurality of events, which transfers a subset of entries from the plurality of entries in the global log to a second memory space, and which analyzes each of said transferred subsets in turn by comparing, with respect to each entry in the subset of entries, an pg,15 instantaneous observed utilization to an instantaneous expected resource utilization to identify a potential error condition during the execution of the service request.

11. The apparatus of claim 10 further comprising a counter which accumulates a count of said entries added to the global event log and which signals the module to transfer the subset of said entries when the count reaches a predetermined value n.

12. The apparatus of claim 10 wherein the service request is characterized as a first service request, and wherein the module is further configured to accumulate entries into the global event log corresponding to events carried out by the software system during a second service request executed during execution of the first service request, wherein the respective entries in the global event log associated with the second service request are commingled with the entries associated with the first service request in a time-sequence corresponding to an ordering in which the respective events occurred.

* * * * *

UNITED STATES PATENT AND TRADEMARK OFFICE
CERTIFICATE OF CORRECTION

PATENT NO. : 7,546,489 B2  Page 1 of 1
APPLICATION NO. : 11/042490
DATED : June 9, 2009
INVENTOR(S) : Robert Sherwood Gittins et al.

It is certified that error appears in the above-identified patent and that said Letters Patent is hereby corrected as shown below:

In Col. 8, line 12
replace "an pg, 15 instantaneous"
with "an instantaneous."

Signed and Sealed this

Fourth Day of August, 2009

JOHN DOLL
*Acting Director of the United States Patent and Trademark Office*